United States Patent Office 2,862,112
Patented Nov. 25, 1958

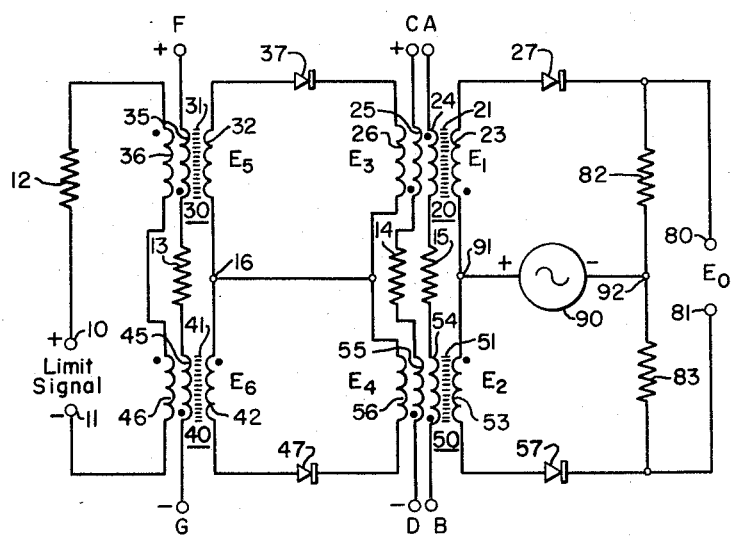

2,862,112

MAGNETIC AMPLIFIER MAXIMUM OUTPUT CONTROL

John F. Ringelman, Catonsville, and Frederick G. Timmel, Baltimore, Md., assignors to Westinghouse Electric Corporation, East Pittsburgh, Pa., a corporation of Pennsylvania Application June 20, 1957, Serial No. 666,954

9 Claims. (Cl. 307—88)

This invention relates to magnetic amplifiers in general and in particular to a maximum output control for a magnetic amplifier.

In many fields of application, the ability to limit the output of a magnetic amplifier to some maximum level is a very desirable feature. In the prior art there exist devices capable of accomplishing this limiting but they are generally mechanical devices, such as motor driven potentiometers, or electronic tube devices such as phototubes. While these existing devices accomplish their intended function, they have undesirable characteristics, such as bulkiness, maintenance of moving parts and non-reliability over lengthy periods of time.

It is an object of this invention to provide an improved magnetic amplifier.

It is another object of this invention to provide a magnetic amplifier with a maximum output control.

It is a further object of this invention to provide a magnetic amplifier whose maximum output control is responsive to an electrical signal.

Further objects of this invention will become apparent from the following description when taken in conjunction with the accompanying drawing. In said drawing, for illustrative purposes only, is shown a preferred form of this invention.

Figure 1 is a schematic diagram of an embodiment of the teachings of this invention.

In the drawing the manner in which the windings of the reactors are wound on their associated cores is indicated by dots which represent points of like instantaneous polarity. Thus, if the dots are on the same end of the reactor core, the windings are wound around the core in the same direction; whereas, if the dots are on opposite ends of the core, the windings are wound in opposite directions.

Referring to Fig. 1 there is illustrated a limiting circuit coupled to a half-wave, push-pull, self-saturating magnetic amplifier. In general, the magnetic amplifier comprises saturable core reactors 20 and 50. The reactor 20 comprises a magnetic core member 21, a load winding 23, a control winding 24 and a bias winding 25. The windings 23, 24 and 25 are inductively disposed on the magnetic core member 21. The reactor 50 comprises a magnetic core member 51, a load winding 53, a control winding 54 and a bias winding 55. The windings 53, 54 and 55 are inductively disposed upon the magnetic core member 51.

The load windings 23 and 53 of reactors 20 and 50, respectively, have a common terminal 91. A rectifier 57 and a resistor 83 are connected in series circuit relationship between the uncommon terminal of the load winding 53 and a terminal 92. A rectifier 27 and a resistor 82 are connected in series circuit relationship between the uncommon terminal of the load winding 23 and the terminal 92. An alternating current voltage is connected to the terminals 91 and 92. The output for the magnetic amplifier is taken from across the resistors 82 and 83 at a pair of terminals 80 and 81.

A control circuit for resetting the magnetic amplifier comprising the control winding 24 of the reactor 20 and the control winding 54 of the reactor 50 is connected in series circuit relationship with a resistor 15 between the terminals A and B. A bias circuit for resetting the reactors 20 and 50 comprises the bias winding 25 of the reactor 20 and the bias winding 55 of the reactor 50 connected in series circuit relationship with a resistor 14 between the terminals C and D.

The limiting circuit comprises, in general, a pair of reactors or saturable inductive devices 30 and 40. The reactor 30 includes a magnetic core member 31, an output winding 32, a bias winding 35 and an input winding 36. The windings 32, 35 and 36 are inductively disposed on the magnetic core member 31. The reactor 40 includes a magnetic core member 41, an output winding 42, a bias winding 45 and an input winding 46. The windings 42, 45 and 46 are inductively disposed on the magnetic core member 41.

An input, not shown, to the limiting circuit is applied to the terminals 10 and 11. The input windings 36 and 46 of the reactors 30 and 40, respectively, are connected to the limit input terminals 10 and 11 through a resistor 12. A bias circuit for the limiting circuit comprises the bias winding 35, the bias winding 45 and a resistor 13 connected in series circuit relationship between the terminals F and G.

The output winding 32 of the reactor 30 and the output winding 42 of the reactor 40 have a common terminal. Connected in series circuit relationship between the uncommon terminal of the output winding 32 and the common terminal 16 is a rectifier 37 and a limit winding 26. Connected between the uncommon terminal of the output winding 42 of the reactor 40 and the common terminal 16 is a rectifier 47 and a limit winding 56 in series circuit relationship. The limit winding 26 is inductively disposed on the reactor 20. The limit winding 56 is inductively disposed on the reactor 50.

The operation of the illustrated half-wave, push-pull, self-saturating magnetic amplifier exclusive of the limiting circuit, is well known in the art. It will suffice to say for the present that the reactors 20 and 50 are biased to a desired operating point by the application of a signal to the bias windings 25 and 55 and that the desired output at the terminals 80 and 81 is obtained by various magnitudes and polarities of a control signal applied to the terminals A and B of the control circuit.

It will now be shown how the limiting circuit limits the maximum output of the half-wave magnetic amplifier as illustrated. Consider the operation when there is no control signal to the amplifier at the control circuit terminals A and B nor any limit signal to the limiting circuit at the terminals 10 and 11. Let us assume that the reactors 20 and 50 are biased to one-half of full output. That is, a signal of sufficient magnitude is applied to the bias terminals C and D to drive the reactors 20 and 50 half way towards negative saturation. Assume that the reactors 30 and 40 are biased to cut off.

At the beginning of a conduction half-cycle for the half-wave amplifier, with the polarity of the alternating current voltage 90 as shown in Fig. 1, the voltage furnished by the alternating current voltage 90 will appear across the load windings 23 and 53 of the reactors 20 and 50 as $E_1$ and $E_2$, as shown in Fig. 1. Through induction, the voltages $E_3$ and $E_4$ will appear across the limit windings 26 and 56 of the limiting circuit, respectively. The voltage $E_3$ will then appear across the output winding 32 of the reactor 30 as voltage $E_5$ and the voltage $E_4$ will appear across the output winding 42 of the reactor 40 as $E_6$. The reactors 30 and 40 are designed such as under zero signal quiescent conditions for the half-wave amplifier, and with the reactors 30 and 40 biased to cut off, the voltage $E_5$ will drive the reactor 30 half way from negative to positive saturation and the voltage $E_6$ will drive the reactor 40 half way from negative to positive saturation. The reactors 30 and 40 are designed so that the exciting currents through the output windings 32 and 42, respectively, are very small. Therefore, we can see that under the above conditions the operation of the amplifier will be unaffected by the limiting circuit since the limiting circuit has no loading effect on the amplifier.

Assume that the limit signal to the terminals 10 and 11 is maintained at zero and the control signal to the amplifier at the control terminals A and B is increased from zero to a point where a maximum output is obtained from the amplifier at terminals 80 and 81.

Assume that the terminal B is at a positive polarity with respect to the terminal A. Therefore, as per the polarity dots shown in the drawing, the reactor 20 will be cut off and the reactor 50 will be saturated allowing an output to appear across the resistor 83. Therefore, the voltage from the alternating current voltage 90 will appear across the load winding 23 of the reactor 20 as $E_1$ for the entire conduction half cycle.

The volt-second integral $E_1$ now applied to the load winding 23 of the reactor 20 by the alternating current voltage 90 will be twice that applied under the zero control signal at the terminals A and B hereinbefore described. It then follows that the volt-second integral applied to the limit winding 26 of the reactor 20 and thus to the output winding 32 of the reactor 30 as $E_5$ is also twice as large. Since the reactor 50 has been saturated by the application of the control voltage to the terminals A and B, the load winding 53 is approximating a zero impedance and supports very little voltage. Therefore, we may assume that $E_2$ would equal zero as would $E_4$ and $E_6$.

The volt-second integral corresponding to $E_5$ is now just capable of carrying the flux of the reactor 30 from negative to positive saturation during each conduction half-cycle of the amplifier. However, since the reactor 30 will not saturate until the end of a conduction half-cycle of the amplifier and only exciting current will flow in the output winding 32, the limiting circuit will still have no loading effect upon the amplifier.

If the limit signal, as applied to the terminals 10 and 11, is increased a small amount from zero, the initial flux level of the reactors 30 and 40 will be at some intermediate level between positive and negative saturation at the beginning of a conduction half-cycle of the amplifier. Then, when the amplifier is driven to its maximum output, as hereinbefore described, the reactor 30 will no longer be able to support the entire volt-second integral of the voltage $E_5$ since the voltage $E_5$ is sufficient in itself to drive the reactor 30 from negative to positive saturation. Thus, before the end of a conduction half-cycle, the reactor 30 will saturate and the output winding 32 of the reactor 30 will effectively be shorted. As a result, the voltage supplied by the alternating current voltage 90 will appear across the resistor 82 of the magnetic amplifier output circuit and will reduce the output voltage $E_0$ at the terminals 80 and 81 to zero for the remainder of the conduction half-cycle. Thus, the output $E_0$ of the magnetic amplifier will never be able to go above some maximum average level which will be determined by the magnitude of the limit signal as applied to the terminals 10 and 11.

If the limit signal presented to the terminals 10 and 11 is further increased so that the input windings 36 and 46 will drive the flux levels of the reactors 30 and 40 to half way between negative and positive saturation, then at the beginning of a conduction half-cycle of the amplifier the reactors 30 and 40 will just be driven to saturation during the amplifier conduction half-cycle, assuming the control signal presented to the terminals A and B is zero. Any attempt to control the amplifier by the application of the control signal to the terminals A and B as before with the terminal B positive, with respect to A, will result again in an increase of the voltage $E_5$ as described above. The reactor 30 will be unable to support this increase in voltage and, therefore, the maximum output of the amplifier will be essentially zero. Further, intermediate levels of bias voltage applied to terminals F and G result in intermediate maximum output levels of the amplifier.

Therefore, as illustrated in the drawing and described above, we have a magnetic amplifier whose maximum output may be changed as a function of an electrical limit signal.

In conclusion, it is pointed out that while the illustrated example constitutes a practical embodiment of our invention, we do not limit ourselves to the exact details shown, since modification of the same may be varied without departing from the spirit of this invention.

We claim as our invention:

1. In a magnetic amplifier, in combination, a first saturable means, an output circuit for said magnetic amplifier, said output circuit comprising load winding means inductively associated with said first saturable means, means for connecting an alternating current voltage to said output circuit for said magnetic amplifier, unidirectional current means and means for connecting a load to said output circuit for said magnetic amplifier, a control circuit for said magnetic amplifier comprising control winding means inductively associated with said first saturable means and means for connecting a control signal to said control circuit, and a limiting circuit whereby the maximum average output of said magnetic amplifier may be limited, said limiting circuit comprising a second saturable means, an input circuit having input winding means inductively associated with said second saturable means and means for applying an input signal to said input circuit, a bias circuit for said second saturable means having bias winding means inductively associated with said second saturable means and means for connecting a bias signal to said bias circuit means for said second saturable means, the output circuit of said limiting circuit comprising output winding means inductively associated with said second saturable means, unidirectional current means and limiting winding means inductively associated with said first saturable means.

2. In a magnetic amplifier, in combination, a first saturable means, an output circuit for said magnetic amplifier, said output circuit comprising load winding means inductively associated with said first saturable means, means for connecting an alternating current voltage to said output circuit for said magnetic amplifier, unidirectional current means and means for connecting a load to said output circuit for said magnetic amplifier, a control circuit for said magnetic amplifier comprising control winding means inductively associated with said first saturable means and means for connecting a control signal to said control circuit, a bias circuit for said first saturable means comprising bias winding means inductively associated with said first saturable means and means for connecting a bias signal to said bias circuit for said first saturable means, and a limiting circuit whereby the maximum average output of said magnetic amplifier may be limited, said limiting circuit comprising a second saturable means, an input circuit having input winding means inductively associated with said second saturable means and means for applying an input signal to said input circuit, a bias circuit means for said second saturable means having bias winding means inductively associated with said second saturable means and means for connecting a bias signal to said bias circuit means for said second saturable means, the output circuit of said limiting circuit comprising output winding means inductively associated with said second saturable means, unidirectional current means and limiting winding means inductively associated with said first saturable means.

3. In a magnetic amplifier, in combination, a first saturable means, an output circuit for said magnetic amplifier comprising load winding means inductively associated with said first saturable means, means for connecting an alternating current voltage to said output circuit for said magnetic amplifier, unidirectional current means poled to allow conduction in said output circuit on alternate half cycles of said applied alternating current voltage and means for connecting a load to said output circuit for said magnetic amplifier, a control circuit for said magnetic amplifier comprising control winding means inductively associated with said first saturable means and means for connecting a control signal to said control circuit, and a limiting circuit whereby the maximum average output of said magnetic amplifier may be limited, said limiting circuit comprising a second saturable means, an input circuit having input winding means inductively associated with said second saturable means and means for applying an input signal to said input circuit, a bias circuit means for said second saturable means having bias winding means inductively associated with said second saturable means and means for connecting a bias signal to said bias circuit means for said second saturable means, the output circuit for said limiting circuit comprising output winding means inductively associated with said second saturable means, unidirectional current means and limiting winding means inductively associated with said first saturable means.

4. In a magnetic amplifier, in combination, a first saturable means, said first saturable means being driven to saturation during one half cycle of an applied alternating current voltage and then reset on the following half cycle, circuit means for resetting said first saturable means comprising a control circuit means and a bias circuit means, and limiting circuit means whereby the maximum average output of said magnetic amplifier may be limited, said limiting circuit comprising a second saturable means, input winding means, bias winding means and output winding means inductively associated with said second saturable means, said output winding means of said second saturable means being connected to limiting winding means inductively associated with said first saturable means.

5. In a magnetic amplifier, in combination, a first saturable means, said first saturable means being driven to saturation during one half cycle of an applied alternating current voltage and then reset on the following half cycle, circuit means for resetting said first saturable means comprising a control circuit having control winding means inductively associated with said first saturable means and means for applying a control signal to said control circuit and a bias circuit having bias winding means inductively associated with said first saturable means and means for applying a bias signal to said bias circuit, and limiting circuit means comprising a second saturable means, input winding means, bias winding means and output winding means inductively associated with said second saturable means, said output winding means of said second saturable means being connected to limiting winding means inductively associated with said first saturable means.

6. In a magnetic amplifier, in combination, a first saturable means, said first saturable means being driven to saturation during one half cycle of an applied alternating current voltage and then reset on the following half cycle, circuit means for resetting said first saturable means comprising a control circuit having control winding means inductively associated with said first saturable means and means for applying a control signal to said control circuit and a bias circuit having bias winding means inductively associated with said first saturable means and means for applying a bias signal to said bias circuit, and limiting circuit means whereby the maximum average output of said magnetic amplifier may be limited, said limiting circuit comprising a second saturable means, said second saturable means comprising input winding means bias winding means and output winding means inductively associated with said second saturable means, said output winding means of said second saturable means being connected by unidirectional current means to limiting winding means inductively associated with said first saturable means.

7. In a magnetic amplifier, in combination, a first saturable means, said first saturable means being driven to saturation during one half cycle of an applied alternating current voltage and then reset on the following half cycle, circuit means for resetting said first saturable means comprising a control circuit having control winding means inductively associated with said first saturable means and means for applying a control signal to said control circuit and a bias circuit having bias winding means inductively associated with said first saturable means and means for applying a bias signal to said bias circuit, and limiting circuit means whereby the maximum average output of said magnetic amplifier may be limited, said limiting circuit comprising a second saturable means, an input circuit for said limiting circuit having input winding means inductively associated with said second saturable means and means for applyng a limiting signal to said input circuit, a bias circuit for said limiting circuit having bias winding means inductively associated with said second saturable means and means for applying a bias signal to said bias winding means, and output winding means inductively associated with said second saturable means connected to limiting winding means inductively associated with said first saturable means.

8. In a magnetic amplifier, in combination, a pair of saturable magnetic cores which are driven to saturation during one half cycle of an applied alternating current voltage and then reset on the following half cycle, circuit means for resetting said cores comprising a control circuit having control windings inductively disposed on each of said cores and means for applying a control signal to said control windings and a bias circuit having bias windings inductively disposed on each of said cores, and a limiting circuit comprising a limiting winding inductively disposed on each of said cores, a common terminal connecting said limiting windings in series, a unidirectional current device and an output winding of a first saturable inductive device connected in series between the uncommon terminal and said common terminal of one of said limiting windings, a unidirectional current device and an output winding of a second saturable inductive device connected in series between the uncommon terminal and said common terminal of the other said limiting windings, a bias circuit for said first and second saturable inductive devices comprising a bias winding inductively disposed on each of said saturable inductive devices and means for applying a bias signal to said bias windings, and an input winding inductively disposed on each of said saturable inductive devices and means for applying a limiting signal to said input windings.

9. In a magnetic amplifier, in combination, a pair of saturable magnetic cores which are driven to saturation during one half cycle of an applied alternating current voltage and then reset on the following half cycle, circuit means for resetting said cores comprising a control circuit having control windings inductively disposed on each of said cores and means for applying a control signal to said control windings and a bias circuit having bias windings inductively disposed on each of said cores, and a limiting circuit comprising a limiting winding inductively disposed on each of said cores, a common terminal connecting said limiting windings in series, a unidirectional current device poled to permit conduction during the conduction half-cycle of said magnetic amplifier and an output winding of a first saturable inductive device connected in series between the uncommon terminal of said common terminal of one of said limiting windings, a unidirectional current device poled to permit conduction during the conduction half-cycle of said magnetic amplifier and an output winding of a second saturable inductive device connected in series between the uncommon terminal and said common terminal of the other of said limiting windings, a bias circuit for said first and second saturable inductive devices comprising a bias winding inductively disposed on each of said saturable inductive devices and means for applying a bias signal to said bias windings, and an input winding inductively disposed on each of said saturable inductive devices and means for applying a limiting signal to said input windings.

References Cited in the file of this patent

UNITED STATES PATENTS

| | | |
|---|---|---|
| 2,644,129 | Ramey | June 30, 1953 |
| 2,762,967 | Stateman | Sept. 11, 1956 |
| 2,814,737 | Sunderlin | Nov. 26, 1957 |